(No Model.)
R. W. TURNER.
FORK FOR DOMESTIC AND OTHER USES.
No. 268,153. Patented Nov. 28, 1882.
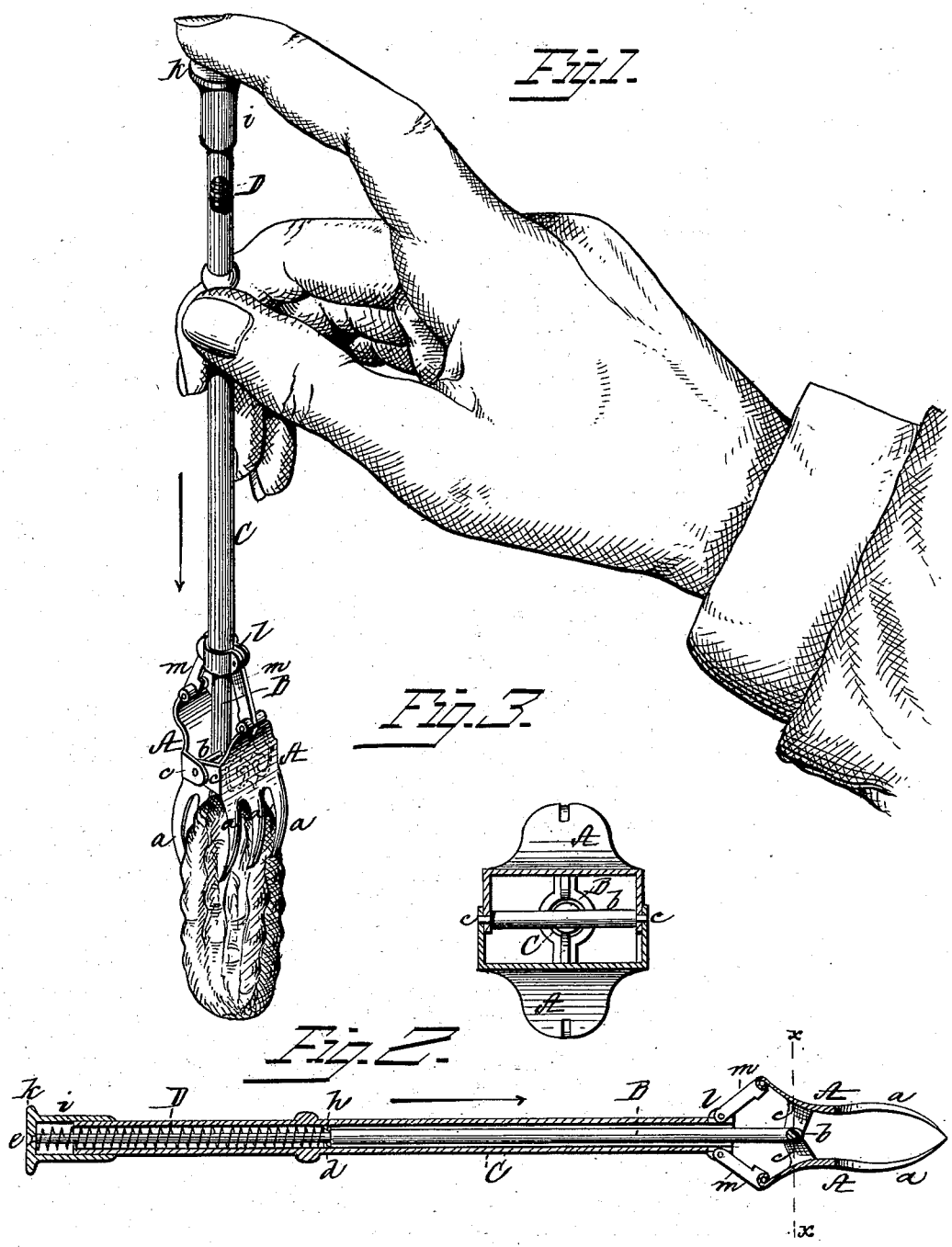
WITNESSES
Franck L. Ouraud
G. N. Whittington
INVENTOR,
Roswell W. Turner,
pr Norman W. Stearns,
Attorney.

UNITED STATES PATENT OFFICE.

ROSWELL W. TURNER, OF BOSTON, MASSACHUSETTS.

FORK FOR DOMESTIC AND OTHER USES.

SPECIFICATION forming part of Letters Patent No. 268,153, dated November 28, 1882.

Application filed August 17, 1882. (No model.)

*To all whom it may concern:*

Be it known that I, ROSWELL W. TURNER, of Boston, in the county of Suffolk and State of Massachusetts, have invented certain Improvements in Forks or Implements for Domestic and other Uses, of which the following is a full, clear, and exact description, reference being had to the accompanying drawings, making part of this specification, in which—

Figure 1 is a perspective view representing a fork or implement for domestic use, &c., having my improvements applied thereto, and also representing the manner by which its jaws are opened. Fig. 2 is a central vertical section, showing the jaws closed. Fig. 3 is a transverse section on the line $x$ $x$ of Fig. 2.

My invention relates to that class of household devices provided with jaws for grasping and removing various articles—such as fruit, pickles, &c.—from bottles and jars, meats and other articles of food from the pot containing the boiling water in which they are cooked, and burning coals or cinders from a fire, &c.; and my invention has special reference to certain modifications in the construction of a culinary fork or domestic implement, for which an application for Letters Patent of the United States is filed simultaneously herewith and to be enumerated herein.

My invention consists in transposing the location of the toggle-arms by connecting the upper ends of the jaws and the lower end of the tubular handle therewith; also in connecting the lower end of the central rod with the fulcrum on which the jaws of said implement are pivoted.

My invention also consists in providing the tubular handle with a collar or projection, which serves as a stop for the finger and thumb to abut against to prevent their slipping on the tube when pressure is applied to move the rod in order to open the jaws.

To enable others skilled in the art to understand and use my invention, I will proceed to describe the manner in which I have carried it out.

In the said drawings, A A represent a pair of jaws provided with tines or forks $a$, and pivoted together by a transverse pin, $b$, extending between their turned-down portions $c$, the pin serving as the fulcrum on which the jaws open and close. To this fulcrum-pin is secured the lower end of a long rod, B, passing centrally through a long cylindrical tube, C, serving as a handle for the implement, the upper portion of the rod from $d$ to $e$ being reduced in diameter and surrounded by a spiral spring, D, the lower end of the spring bearing on a collar, $h$, fixed within the tube, and the upper end of the spring abutting against the under side of a tubular sleeve, $i$, having an enlarged head, $k$, and secured to the top of the reduced portion of the rod. This sleeve fits over the upper end of the tube, and the spring is prevented from unseating it by the upper end of the large portion of the rod coming into contact with the collar $h$. To the lower end of the tube D is secured a collar, $l$, to opposite sides of which are pivoted the upper ends of two toggle-arms $m$ $m$, the lower ends of the latter being pivoted to the upper outwardly-projecting ends of the pair of jaws.

From the foregoing construction it will be seen that when the implement is desired for use—for instance, to remove a pickle from a bottle—the jaws are entered therein in their normal closed position, and then are opened to catch around or into it by pressure of the forefinger, Fig. 1, on the head of the sleeve $i$ against the resistance of the spring, the large finger and thumb pressing against the under side of a collar or projection, $n$, surrounding the outside of the tubular handle, in order to keep hold thereof without slipping. After the pickle has been inclosed by the open jaws they are allowed to firmly grasp it by releasing the pressure on the head of the sleeve, the spring having sufficient force to enable the jaws to retain their hold on the pickle while being removed from the bottle.

In the foregoing description I have referred to a tube inclosing a rod surrounded by a spring, with a pair of toggle-arms for expanding or opening the two jaws, and also a sleeve secured to the upper end of the rod and made to slide upon the outside of the upper end of the tube. These features are not my invention, and I do not therefore lay claim thereto, they being combined and claimed in an application made simultaneously herewith. My present invention is for the difference in arrangement and manner of connecting the toggle-arms, as well as in the form of the jaws, and also for the collar on the outside of the tube to prevent the hand from slipping thereon.

I claim—

1. The toggle-arms $m\ m$, arranged as described, for connecting the upper ends of the jaws A with the lower end of the tube C, in combination with the central rod, B, having its lower end secured to the fulcrum $b$ of the jaws, and with its upper end surrounded by a spiral spring, D, and attached to a tubular sleeve, $i$, made to slide over the upper end of the tube, as and for the purpose described.

2. The collar or projection $n$ on the outside of the tube, in combination with the sleeve $i$, rod B, spiral spring D, toggle-arms $m\ m$, and jaws A A, constructed to operate substantially as set forth.

Witness my hand this 12th day of August, 1882.

ROSWELL W. TURNER.

In presence of—
CHAS. E. DYER,
JAS. W. CHAPMAN.